US006788318B2

(12) United States Patent
Chen

(10) Patent No.: US 6,788,318 B2
(45) Date of Patent: Sep. 7, 2004

(54) METHOD FOR MANIPULATING MULTIPLE MULTIMEDIA OBJECTS

(75) Inventor: Pi-Chun Chen, Taipei (TW)

(73) Assignee: Ulead Systems, Inc., Taipei (TW)

(*) Notice: Subject to any disclaimer, the term of this patent is extended or adjusted under 35 U.S.C. 154(b) by 505 days.

(21) Appl. No.: 09/851,256

(22) Filed: May 8, 2001

(65) Prior Publication Data

US 2002/0140736 A1 Oct. 3, 2002

(30) Foreign Application Priority Data

Mar. 28, 2001 (TW) .......................................... 90107365 A

(51) Int. Cl.$^7$ ................................................ G09G 5/00
(52) U.S. Cl. ........................ 345/777; 345/747; 345/776; 345/778
(58) Field of Search ................................. 345/700, 747, 345/776, 777, 778, 802, 808, 856, 857, 803; 715/515, 526

(56) References Cited

U.S. PATENT DOCUMENTS

| 5,337,161 | A | * | 8/1994 | Hube | 358/448 |
| 5,745,716 | A | * | 4/1998 | Tchao et al. | 345/777 |
| 6,134,568 | A | * | 10/2000 | Tonkin | 715/526 |
| 6,163,784 | A | * | 12/2000 | Taguchi | 715/527 |
| 6,301,573 | B1 | * | 10/2001 | McIlwaine et al. | 706/61 |
| 6,442,523 | B1 | * | 8/2002 | Siegel | 704/270 |
| 6,549,300 | B2 | * | 4/2003 | Motamed et al. | 358/1.18 |
| 6,621,506 | B2 | * | 9/2003 | Burbidge | 345/764 |

* cited by examiner

*Primary Examiner*—John Cabeca
*Assistant Examiner*—Cuong T. Thai

(57) ABSTRACT

The present invention provides a method for manipulating multiple multimedia objects in a computer. The method comprises the steps of: storing a multimedia production as a set of layers, where each of the layers has objects independent from each other, displaying a plurality of tabs, each of which refers to a page representing one of the layers, selecting one of the tabs, and displaying the page referred to by the selected tab and the objects of the layer marked on the selected tab upon the displayed page.

24 Claims, 4 Drawing Sheets

METHOD FOR MANIPULATING MULTIPLE MULTIMEDIA OBJECTS

BACKGROUND OF THE INVENTION

1. Field of the Invention

The present invention relates to a software-based multimedia authoring application and particularly to a method for manipulating multiple multimedia objects within a multimedia production, which has a graphic user interface more user-friendly than a conventional one.

2. Description of the Prior Art

A graphical image manipulation computer program, such as Ulead Photo Impact or Adobe Photoshop 4.0, may store a graphical image as a set of image layers. Such a program builds a final image by compositing the image layers together.

Referring to FIG. 1, a conventional graphical image document 1 includes a set of image layers, denoted as layers L1, 2, . . . , Ln, organized in a layer stack. For example, the image layer L1 typically includes an image 11 and compositing controls 12. The compositing controls 12 may include a global opacity 12a and a transfer mode 12b. The global opacity 12a controls, in essence, the transparency of the entire image layer L1, whereas the transfer mode determines how the colors in the image layer L1 mix with the colors accumulated from the underlying layers. The compositing controls may also be considered to include dynamic masks.

Additionally, a multimedia production may be stored as a set of layers. FIG. 2 shows an animation with dynamic images and sounds. The animation comprises four multimedia objects which are a fixed rectangle 21, a fixed wall 22 and two moving balls 23a and 23b. Their interactions is explained below.

1. Graphical Interaction
   A. The fixed rectangle 21 has the greatest depth of field among the other image. It is always covered where the fixed rectangle 21 overlaps with any one of the images of the other three objects.
   B. The depths of field of the wall 22 and balls 23a and 23b are the same. When the balls 23a and 23b bump into the wall 22, off of which they will rebound. This makes the motion of the balls 23a and 23b bounded by the wall 22 and their images will never meet.
2. Sound Interaction
   A. The fixed rectangle 21 has no sound interaction with the others.
   B. A bumping sound effect is given off when any one of the balls bumps into the wall 22.

According to the above interactions of the four objects, the animation can be stored as a set of three layers L1, L2 and L3.

The fixed rectangle 21 is stored alone in the layer L1 because it graphically interacts with all the others.

The fixed wall 22 is also stored alone in the layer L2 because it interacts with the fixed rectangle 21 in image, and the balls 23a and 23b in sound.

Since the two balls 23a and 23b interact with each other in neither image nor sound (they never bump into each other and no sound effect is given off), i.e. they are independent from each other, they are both stored in the layer L3.

Conventionally, when editing or authoring the above image document or animation using a software-based multimedia authoring application, such as Adobe Photoshop, users select the layer to be accessed through another select window or menu graphically independent from a main window (workspace). Besides, the objects of the selected layer are displayed in the same way as those of the other layers not selected. The users can easily confuse the objects in the different layers. Furthermore, editing of the objects in the other unselected layers is accessible through a simple right-click. Thus, users are also subject to mistakenly moving to the other layers.

SUMMARY OF THE INVENTION

The object of the present invention is to provide a software-based multimedia authoring application with a graphic user interface making it easier for users to associate objects with layers.

To achieve the above-mentioned object, the present invention provides a method for manipulating multiple multimedia objects in a computer. The method comprises the steps of: storing a multimedia production as a set of layers with each layer having objects independent from each other, displaying a plurality of tabs, each of which refers to a page displaying the contents of a layer and allowing edition of that content, selecting one or more of the tabs, and displaying the page referred to by the selected tab and the contents of the constituent layer.

The present invention further provides a computer program, tangibly stored on a computer-readable medium, for manipulating multiple multimedia objects. The computer program comprises instructions for causing a computer to store a multimedia production as a set of layers, each of which having objects independent from each other, display a plurality of tabs, each of which refers to a page displaying the contents of a layer and allowing edition of that content, select one of the tabs, and display the page referred to by the selected tab and the objects of the layer marked on the selected tab upon the displayed page.

In the present invention, a notebook-like interface is provided by the tabs marked with the layers and pages referred thereto. Users select the layers as they would tabbed sections of a paper notebook. Thus, the interface is more easily used.

BRIEF DESCRIPTION OF THE DRAWINGS

The present invention iscome more fully understood from the detailed description given hereinbelow and the accompanying drawings, given by way of illustration only and thus not intended to be limitative of the present invention.

DETAILED DESCRIPTION OF THE INVENTION

Figure 3:
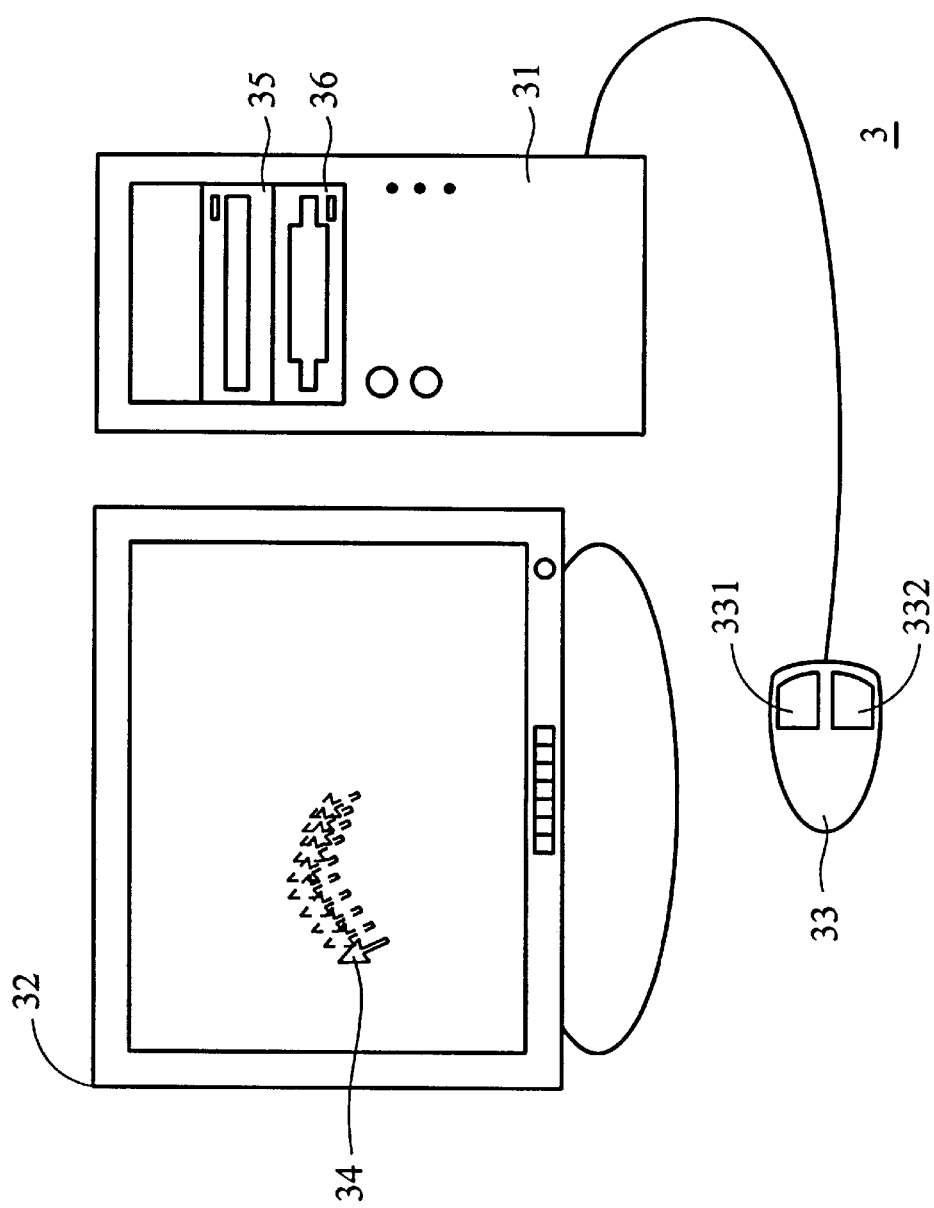
FIG. 3 shows a computer system used in the present invention.

FIG. 3 shows a computer system used in the present invention. A computer system 3 comprises a host 31, a display 32, a mouse 33, a CD-ROM driver 35 and a floppy disk driver 36. Users install the invention, stored on a CD or floppy disk into the host 31, causing the computer system 3 to implement the invented method. The mouse 33 generates a pointer 34 on the display 32 to indicate a pointed position, and has a left button 331, a right button 332 and a ball (not shown) on the bottom to allow clicking, right-clicking, and placement of the onscreen pointer, respectively.

Figure 4:
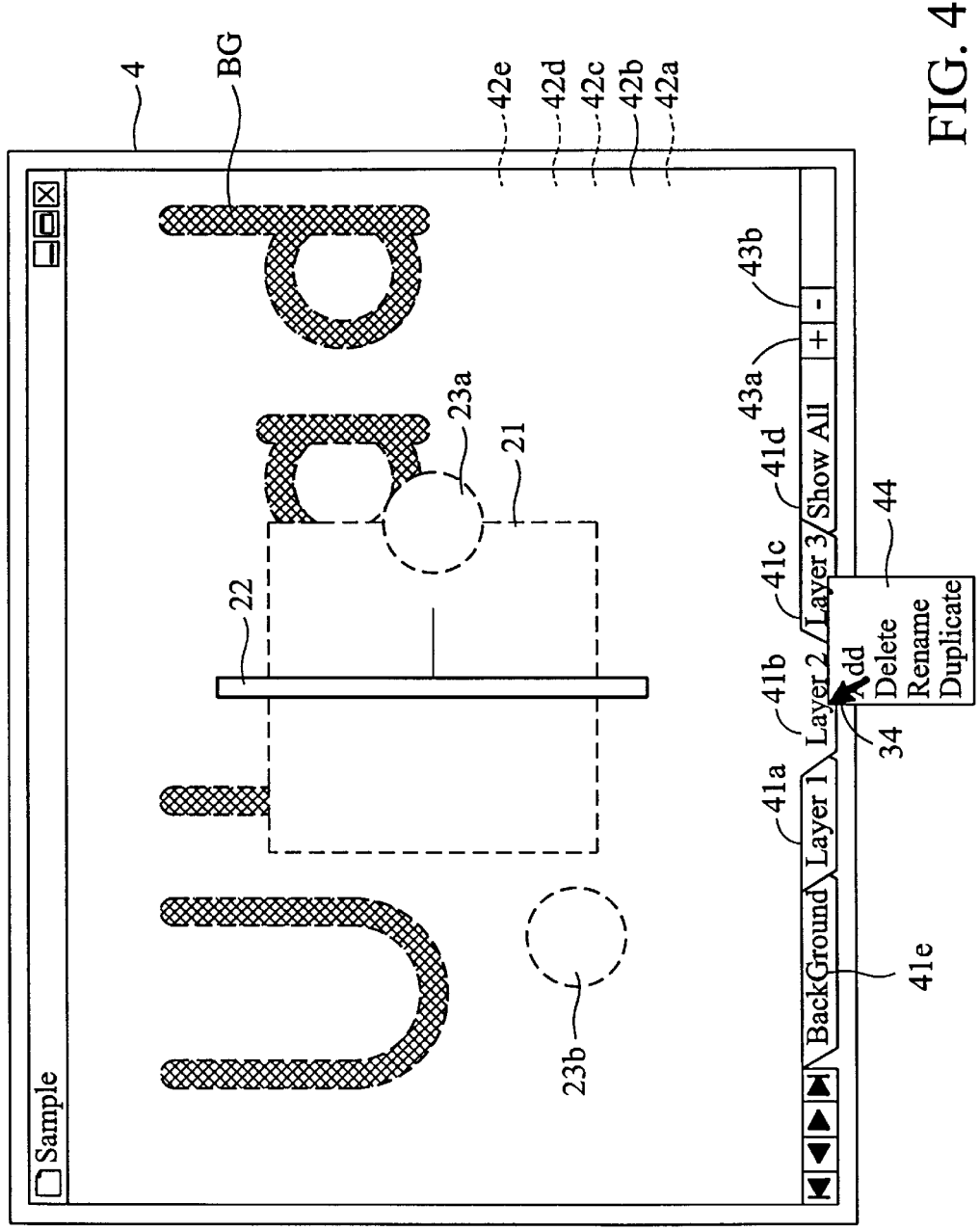
FIG. 4 shows a graphic interface of a software-based multimedia authoring application according to one embodiment of the present invention.

FIG. 4 shows the graphic interface of a software-based multimedia authoring application according to one embodiment of the present invention. The same elements in FIGS. 2, 3 and 4 are referred to by the same symbols.

Figure 1:
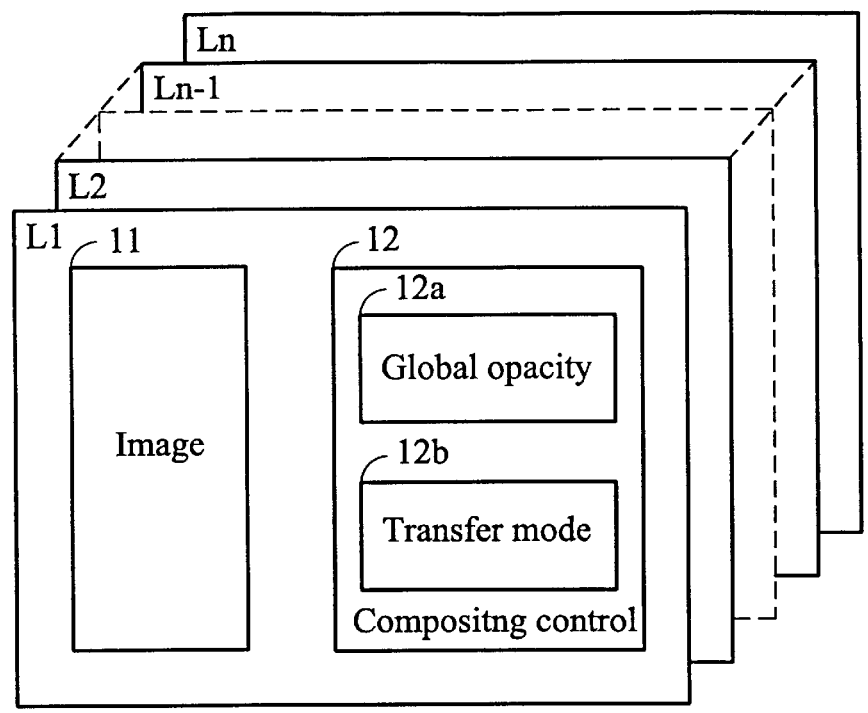
FIG. 1 schematically shows image layers of an image document.
Figure 2:
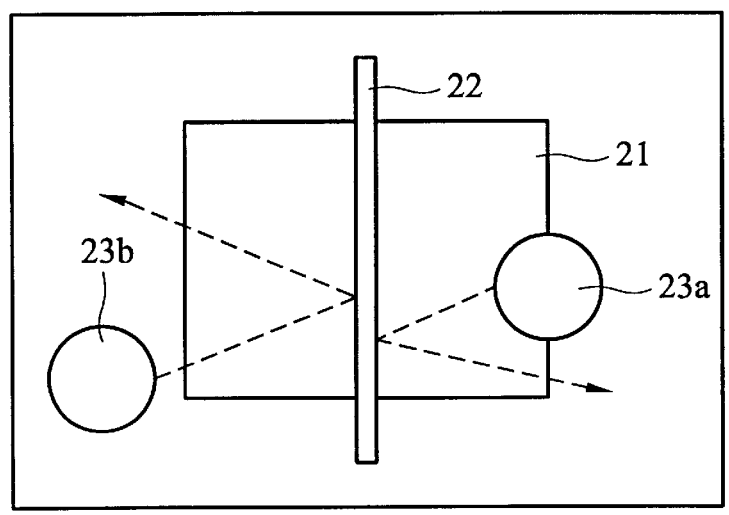
FIG. 2 is a diagram showing a computer animation.

A main window 4 is for editing the animation in FIG. 2 and comprises three tabs 41a, 41b and 41c, marked with Layer1, Layer2 and Layer3 respectively. Layer1, Layer2 and Layer3 represent the layers L1, L2 and L3 of the animation respectively. The tabs 41a, 41b and 41c respectively refer to pages 42a, 42b and 42c. When a user clicks the tab 41b, the host 31 determines the tab 41b is selected and displays the page 42b, referred to by the tab 41b on the display 32. The pages 42a and 42c are covered by the page 42b.

In addition to displaying the page 42b, the host 31 also displays the object 22 (the wall) of the selected layer L2 upon the page 42b, and grays the objects 21, 23a and 23b of the unselected layers L1 and L3 in the display 32. Furthermore, the editing of the grayed objects 21, 23a and 23b is disabled by the host 31. Only the objects 22 normally displayed are available to be edited. Thus, the user can see all the objects from their relative position, allowing easy alignment and preventing undesired or accidental relocation to unselected layers.

The operation is similar when the tab 41a or 41c is selected and no further iteration is made.

The main window 4 further comprises an Add button 43a and a Delete button 43b. When the user clicks the Add button, the host 31 displays an additional tab (not shown) labeled Untitled, adjacent to the pre-selected tab 41b, which refers to an additional blank page (not shown) without any objects. When the user clicks the Delete button 43b, the host 31 deletes the displayed page 42b and the tab 41b referring thereto.

On the other hand, when the user right-clicks the tab 41b, the host 31 displays or pops up a menu 44 providing Add, Delete, Rename and Duplicate functions.

The main window further comprises a Show-all tab 41d and a Background tab 41e. When the user clicks the Show-all tab 41d, the host displays the Show-all page 42d and the objects 21, 22, 23a and 23b of all the layers L1, L2 and L3 upon the Show-all page 42d. When the user clicks the Background tab 41e, the host displays the Background page 42e, display a background image BG upon the Background page 42e, and gray the objects 21, 22, 23a and 23b of all the layers L1, L2 and L3.

When the user drags the tab 41b in front of the tab 41a, the order of the tabs 41a and 41b is reversed.

Figure 5:
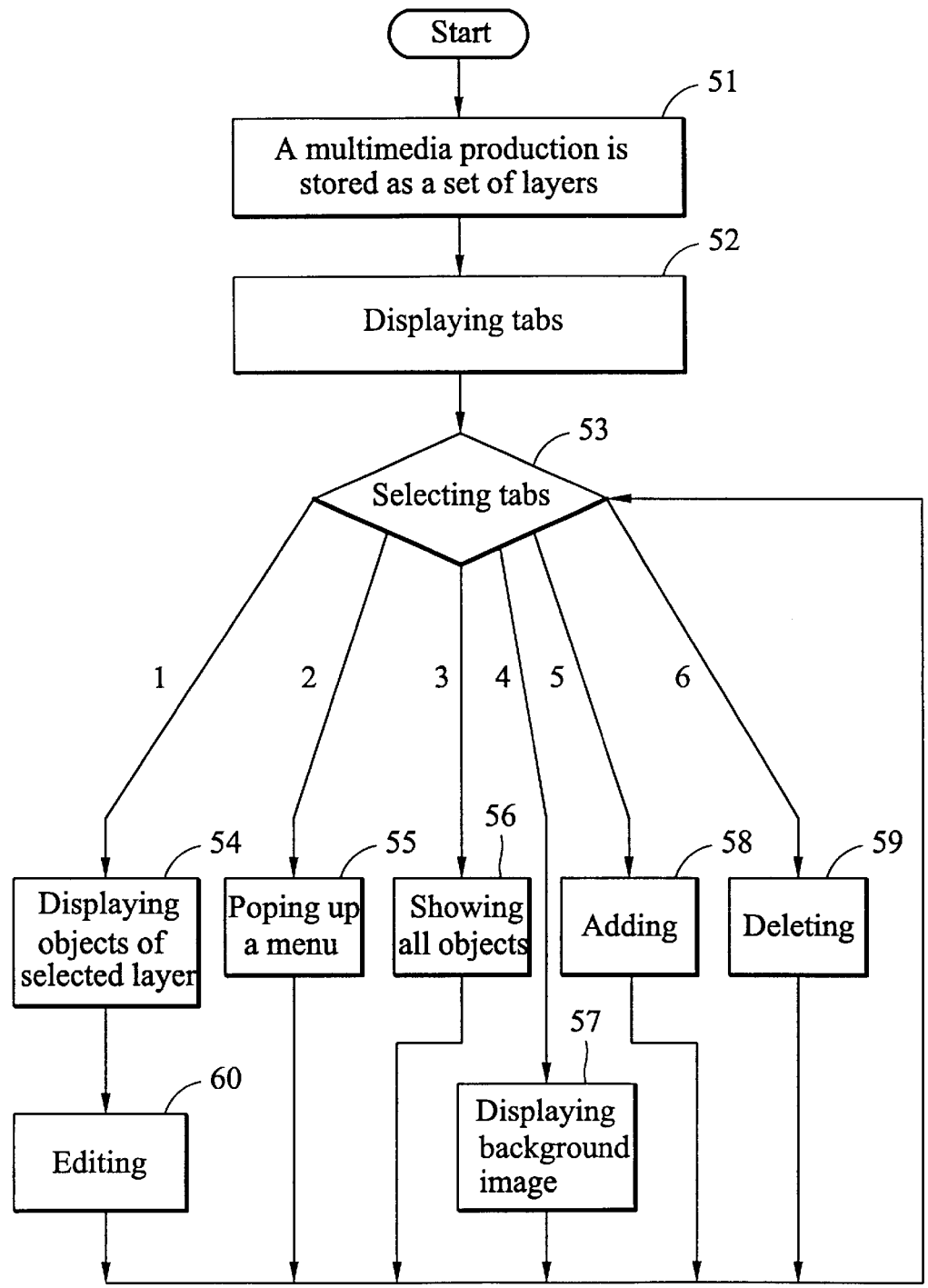
FIG. 5 is a flowchart showing a method for manipulating multiple multimedia objects according to one embodiment of the invention.

FIG. 5 is a flowchart showing a method for manipulating multiple multimedia objects according to one embodiment of the invention.

Please refer to FIGS. 2, 3 and 5.

First, in step 51, a multimedia production having objects 21, 22, 23a and 23b is stored as a set of three layers. Each layer contains objects independent of each other.

Next, in step 52, the host 31 displays three layer tabs, a Show-all tab, a Background tab, an Add button and a Delete button. The three layer tabs, Show-all tab and Background tab refer to three layer pages, a Show-all page and a Background page, respectively.

Then, in step 53, the host 31 determines:

1. if the user clicks the layer tabs. If so, step 54 is implemented, otherwise, step 53 is repeated.

2. if the user right-clicks the layer tabs. If so, step 55 implemented, otherwise, step 53 is repeated.

3. if the user clicks the Show-all tab. If so, step 56 is implemented, otherwise, step 53 is repeated.

4. if the user clicks the Background tab. If so, step 57 is implemented, otherwise, step 53 is repeated.

5. if the user clicks the Add button. If so, step 58 is implemented, otherwise, step 53 is repeated.

6. if the user clicks the Delete button. If so, step 59 is implemented, otherwise, step 53 is repeated.

In step 54, the host 31 displays the contents of the layer represented by the tabbed page selected by the user, and grays the objects of the other layers on the display 32.

In step 60, the host 31 disables the editing of grayed objects and allows the normally displayed objects to be edited.

In step 55, the host 31 displays or pops up a menu 44 adjacent to the pointer 34 from which the user can select Add, Delete, Rename or Duplicate. The user can alternatively add an additional tab and the blank page to which it refers, deleting, copying or renaming the right-clicked tab and the page referred thereto.

In step 56, the host 31 displays the Show-all page and the objects 21, 22, 23a and 23b of all the layers L1, L2 and L3 upon the Show-all page.

In step 57, the host displays the Background page and displays a background image upon the Background page, and gray the objects 21, 22, 23a and 23b of all the layers L1, L2 and L3.

In step 58, the host 31 displays an additional tab marked with Untitled adjacent to the pre-selected tab, which refers to an additional blank page without any objects.

In step 59, the host 31 deletes the displayed page and the tab referring thereto.

Finally, the step 53 is repeated.

In conclusion, the present invention provides a notebook-like interface with tabs marked with layers and pages referred thereto. The users select the layers as they would the tabbed sections of a paper notebook. This makes the interface more friendly and eliminates many problems associated with conventional software-based multimedia authoring applications.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for manipulating multiple multimedia objects in a computer, comprising the steps of:

storing a multimedia production as a set of layers where each of the layers has objects independent of each other;

displaying a plurality of tabs, each of which refers to a page representing one of the layers;

selecting one of the tabs;

displaying the page referred to by the selected tab and the objects of the layer marked on the selected tab upon the displayed page;

displaying a Show-all tab referring to a Show-all page;

selecting the Show-all tab; and displaying the Show-all page and the objects of all the layers upon the Show-all page.

2. The method as claimed in claim 1 further comprising the steps of: displaying an Add button;
selecting the Add button; and
displaying an additional tab referring to an additional page.

3. The method as claimed in claim 1 further comprising the steps of:
displaying a Delete button;
selecting the Delete button; and
deleting the displayed page and the tab referring thereto.

4. The method as claimed in claim 1 wherein the computer has a pointing device which generates a pointed position, right-clicks and clicks on the pointed position.

5. The method as claimed in claim 4 wherein the selected tab is selected by clicking on the selected tab.

6. The method as claimed in claim 4 further comprising the steps of:
right-clicking on one of the tabs; and
displaying a menu for alternatively adding an additional tab and page referred thereto, deleting, copying or renaming the right-clicked tab and the page referred thereto.

7. The method as claimed in claim 1 further comprising the step of:
graying the objects of the other layers marked on the tabs not selected.

8. The method as claimed in claim 7 further comprising the step of:
disabling the editing of the grayed objects.

9. The method as claimed in claim 1 wherein one of the objects is an image.

10. The method as claimed in claim 1 wherein one of the objects is an animation with sound.

11. The method as claimed in claim 1 further comprising the step of:
editing the displayed objects.

12. A method for manipulating multiple multimedia objects in a computer, comprising the steps of:
storing a multimedia production as a set of layers where each of the layers has objects independent of each other;
displaying a plurality of tabs, each of which refers to a page representing one of the layers;
selecting one of the tabs;
displaying the page referred to by the selected tab and the objects of the layer marked on the selected tab upon the displayed page;
displaying a Background tab referring to a Background page;
selecting the Background tab; and
displaying the Background page and a background image upon the Background page.

13. The method as claimed in claim 12 further comprising the steps of:
editing the displayed objects.

14. The method as claimed in claim 12 further comprising the steps of:
displaying an Add button;
selecting the Add button; and
displaying an additional tab referring to an additional page.

15. The method as claimed in claim 12 further comprising the steps of:
displaying a Delete button;
selecting the Delete button; and
deleting a displayed tab and the page referred thereto.

16. The method as claimed in claim 12 wherein the computer has a pointing device which generates a pointed position, right-clicks and clicks on the pointed position.

17. The method as claimed in claim 16 wherein the selected tab is selected by clicking on the selected tab with the pointing device.

18. The method as claimed in claim 16 further comprising the steps of:
right-clicking on one of the tabs with the pointing device; and
displaying a menu for alternatively adding an additional tab and page referred thereto, deleting, copying or renaming the right-clicked tab and the page referred thereto.

19. The method as claimed in claim 12 further comprising the steps of:
graying the objects of the other layers marked on the tabs not selected.

20. The method as claimed in claim 19 further comprising the steps of:
disabling the editing of the grayed objects.

21. The method as claimed in claim 12 wherein one of the objects is an image.

22. The method as claimed in claim 12 wherein one of the objects is an animation with sound.

23. A computer program, tangibly stored on a computer-readable medium, for manipulating multiple multimedia objects, the computer program comprising instructions for causing a computer to:
store a multimedia production as a set of layers, each of which having objects independent from each other;
display a plurality of tabs, each of which refers to a page representing one of the layers;
select one of the tabs;
display the page referred to by the selected tab and the objects of the layer marked on the selected tab upon the displayed page;
display a Show-all tab referring to a Show-all page;
select the Show-all tab; and
display the Show-all page and the objects of all the layers upon the Show-all page.

24. A computer program, tangibly stored on a computer-readable medium, for manipulating multiple multimedia objects, the computer program comprising instructions for causing a computer to:
store a multimedia production as a set of layers, each of which having objects independent from each other;
display a plurality of tabs, each of which refers to a page representing one of the layers;
select one of the tabs;
display the page referred to by the selected tab and the objects of the layer marked on the selected tab upon the displayed page;
displaying a Background tab referring to a Background page;
selecting the Background tab; and
displaying the Background page and a background image upon the Background page.

* * * * *